Dec. 6, 1955　　　　　E. G. TOGSTAD　　　　　2,725,750
ANGULAR RATE INSTRUMENT
Filed Oct. 27, 1952　　　　　　　　　　　　　　2 Sheets-Sheet 1

INVENTOR.
ERLING G TOGSTAD
BY
Lyon & Lyon
ATTORNEYS

TRUE GYRO    SNAP SWITCH    SELF ERECTING

INVENTOR.
ERLING G. TOGSTAD
BY Lyon & Lyon
ATTORNEYS

United States Patent Office 2,725,750
Patented Dec. 6, 1955

2,725,750
ANGULAR RATE INSTRUMENT

Erling G. Togstad, La Crescenta, Calif., assignor of one-third to Theodore H. Fraser, Sherman Oaks, and one-third to William Koerner, Santa Monica, Calif.

Application October 27, 1952, Serial No. 317,126

17 Claims. (Cl. 74—5.6)

This invention relates to an angular rate instrument and more specifically to a device for measuring the angular rate of turn.

The device of this invention may be used as a gyroscope and is characterized by the fact that the rotating mass is made up principally of a series of balls driven in a circular path and constrained in such path by the ball race, which race is itself mounted for pivotal movement about a transverse axis.

By the construction of the device as hereinafter described, this invention permits the manufacture of an angular rate instrument which is exceedingly versatile in its adaptations and yet may be manufactured for an extremely low price.

Accordingly, it is one object of this invention to provide an angular rate instrument of the type described which is simple and economic to manufacture.

It is a further object of this invention to provide such a device which may be readily serviced and repaired.

It is a feature of this invention that in accordance with the type of action desired, various shaped driver contacting faces may be employed selectively. In one instance, a true gyroscopic action can be obtained by employing a driver contact face in which the force acting upon the balls is always in the same direction. With an alternative type contact face, i. e. a convex face of the driving surface, it is possible to obtain what is preferably a snap action. Thus with this type face upon the introduction of rate about the sensitive axis, the force arising from the angular momentum of the balls is augmented by a force due to the application of the driver to the balls at an angle. However, upon removal of the introduction of rate, this force is immediately overcome by the centering spring with the result that the race returns to center.

Rate as used herein is defined as $$\frac{d\theta}{dt}$$

or the rate of change of angle with respect to time.

In the third embodiment, the driver face is concave. Upon the introduction of rate about the sensitive axis in this embodiment, the ball is displaced from center and a force is set up due to the angle at which the ball is engaged by the driving surface tending to return the ball to the center position. Thus upon the removal of the rate, the ball is again centered. This is termed a "self-erecting" action.

The angular rate instrument of the present invention may be used with any suitable pick-off such as switching contacts or a potentiometer or the like and may be used to actuate servo-instruments or to produce a visual indication such as in a bank and turn indicator. Thus the instrument will be used selectively to provide switching or a proportionate displacement of the sensitive element which can be operatively connected to any of the well known instruments responsive to such proportionate displacement such as a potentiometer, E-coil, hydraulic control system or the like.

It is a further object of this invention to provide an instrument of the type described which does not require dynamic balancing.

These and other objects and advantages will be apparent from the annexed specification in which.

Figure 1:
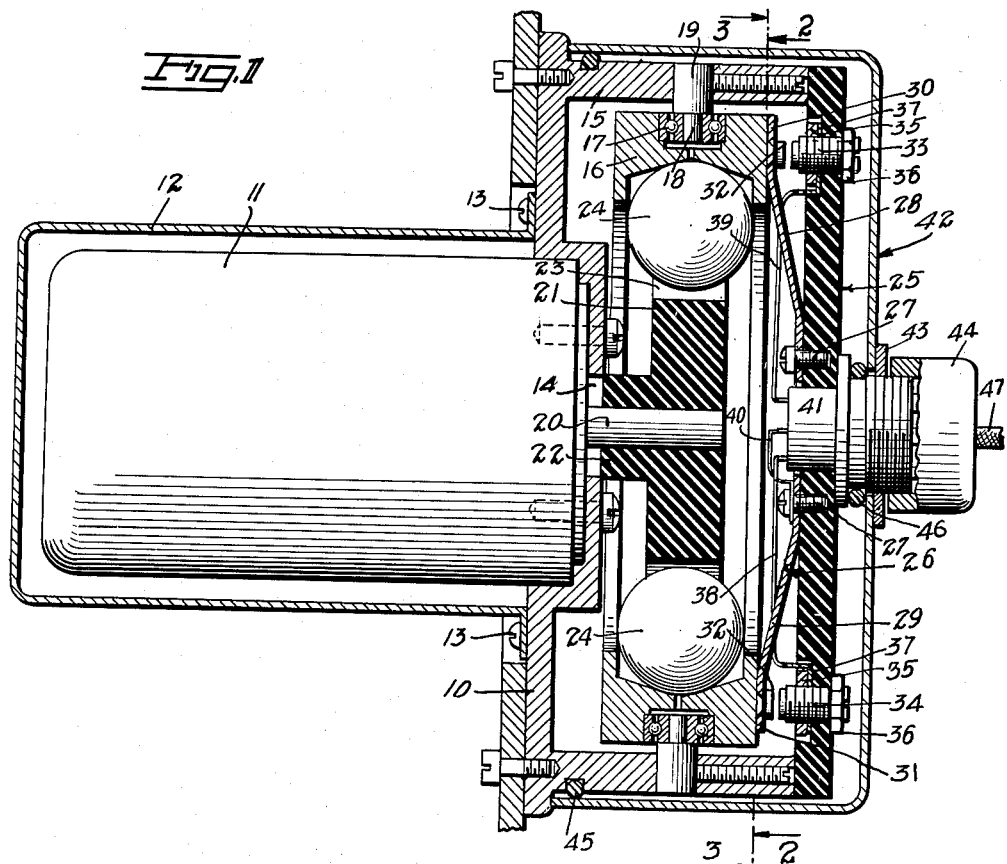
Figure 1 is a vertical section of an angular rate instrument made in accordance with the present invention.
Figure 2:
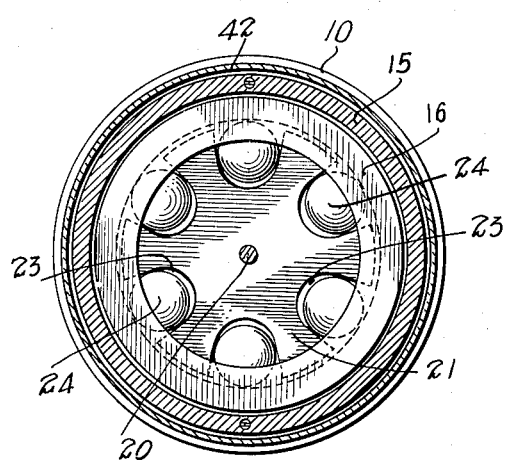
Figure 2 is a reduced section taken along line 2—2 of Figure 1.
Figure 3:
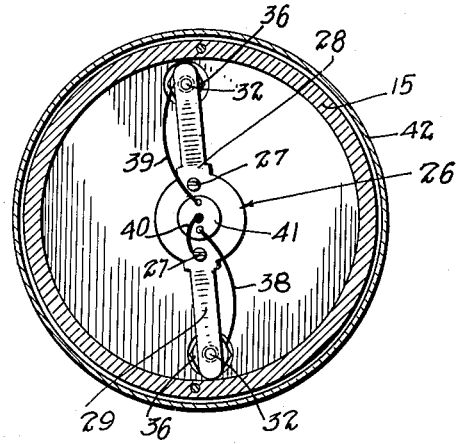
Figure 3 is a reduced section taken along line 3—3 of Figure 1.

Referring now more particularly to the drawings and particularly Figures 1 through 3, there is illustrated a housing 10, on the rear of which there is mounted an electro-motor 11 contained within a housing 12 secured to the housing 10 as by bolts 13. The housing 10 has a central opening 14 and cylindrical side wall 15. A ball race 16 is mounted within the housing and is provided with a pair of diametrically opposed ball bearings 17 receiving the reduced portions 18 of pivot pins 19 as shown. The race 16 is thus mounted as a gimbal.

The motor 11 drives a shaft 20 to which is keyed a driver 21. The driver 21 is in the form of a disk having a hub 22 and a plurality of semi-spherical cut-out portions 23 spaced circumferentially at equal distances about the periphery thereof. The driver 21 is preferably made of a special nylon and serves to drive in the race 16 a plurality of hardened steel balls 24, although any suitable material may be used. In the drawings, the cut-out portions 23 are indicated as being considerably larger than as required to accommodate the balls 24. This has been done for clarity of illustration. In practice, however, it is found that clearance in the order of a few thousandths is sufficient to permit the instrument to operate as desired.

A mounting plate 25 of good insulating material of high dielectric quality is provided which mounts a centering spring 26. The centering spring is affixed to the interior of the mounting plate 25 by a pair of screws 27 and includes a pair of arms 28 and 29 having flattened end portions 30 and 31 adapted to contact the edge of the race 16 as shown in Figure 1. Each of the flattened portions 30 and 31 carries an electrical contact 32. The mounting plate 25 is also provided with a pair of studs 33 and 34 affixed thereto by nuts 35 and 36 and carrying electrical contacts 37. The studs 33 and 34 are thus adjustably mounted in the mounting plate 25. An electric conduit 38 is provided affixed to the stud 34, and a similar conduit 39 is affixed to the stud 33 as shown in Figures 1 and 3. Similarly, a conduit 40 is affixed to the centering spring 26 by attaching the same to one of the screws 27 as shown. Conduits 38, 39 and 40 will lead through a plug 41 to any suitable instrument which it is desired to actuate by means of the instrument just described.

A cover plate 42 is affixed to the plug 41 by a nut 43 and is sealed thereto by O-rings 45 and 46. A connector 44 attaches cable 47 which may connect the instrument to any other instrument or system to be signalled or controlled.

The operation of the above described device is as follows: The electro-motor 11 is energized in a conventional manner and drives the shaft 20 and consequently the drive 21. The drive 21 in turn drives the balls 24 in the race 16. The balls 24, traversing the path of the race 16 will provide an angular momentum proportional to the amount of inertia of the balls and the angular velocity of the balls. Thus any angular motion about an axis perpendicular to the spin axis of the balls and the pivot axis of the gimbal will effect a moment of this angular momentum causing the gimbal to pivot about the axis of the pins 18 an amount proportional to the angular velocity input about the sensitive axis. This movement about the axis 18 will cause one or the other of the contacts 32 to contact one or the other of the contacts 37 and thus complete a circuit which can be connected to any suitable device either to indicate the amount of such pivotal movement or to actuate a suitable mechanism to correct the same.

It will be noted from Figures 1 and 3 that the contacts 32 and 37 are spaced just slightly to one side of the plane of the pivot pins 18. In practice, of course, the contacts can be placed anywhere about the periphery of the outer wall of the race 16 except exactly in the plane of the pivot pins 18. It is preferred to place them slightly to one side of the pivot pins so as to multiply the force acting upon the contacts.

Figure 7:
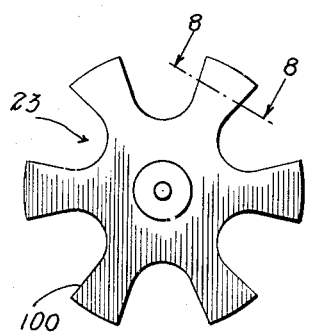
Figure 7 is a plan view of a driver.
Figures 6, 8:
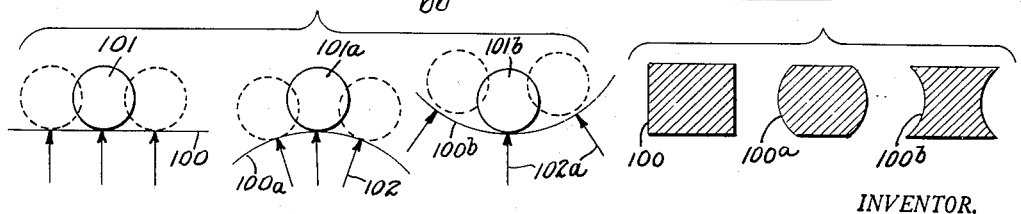
Figure 6 is a diagrammatic representation showing the forces employed in three alternative forms of driver contact faces.
Figure 8 is a section taken along the line 8—8 of Figure 7 in the three alternative cases represented by Figure 6.

Referring now to Figures 6, 7 and 8, there are shown modifications of the driving face of the driver available in accordance with the type of action it is desired to obtain from the instrument. In accordance with the design of the driving contact face against which the balls 24 rest when driven, it is possible to get either a true gyroscopic action, a snap switch type of action or a self-erecting action.

In Figure 7, there has been shown for illustration purposes a plan view of a driver. In Figure 8 there are shown three optional cross sections taken along the line 8—8 of Figure 7. Figure 6 shows the forces operative in accordance with the three-type cross sections shown in Figure 8.

Referring to the column in Figures 6 and 8 under the heading "true gyro," it will be noted that the driving surface 100 of the cavities 23 has been shown as perfectly straight and flat. With this type driver, it makes no difference where the ball 101 is placed with respect to the surface 100 as the force driving the ball will always be in the same direction and there will be no force tending to move the ball either to the right or left as shown in Figure 6.

Referring now to the cross section to the column entitled "snap switch" in Figures 6 and 8, it will be noted that the surface 100a is slightly convex. In practice this will be a matter of minute curvature but has been exaggerated here for clarity of illustration. With the ball 101a in the center, as shown in Figure 6, the race 16 will be in a very unstable condition. Any angular rate about the sensitive axis introduced will cause the ball 101a to pass from the center position to a position to the right or left thereof as shown in phantom in Figure 6. Upon removal of the angular rate about the sensitive axis, however, the ball 101a will be returned under the force of the spring 28 to the mid-position. Particularly when utilizing electrical contacts, as shown in Figure 1, it is desirable that the electrical contact be made or broken with a snap action to avoid burning out of the electrical contacts. With the convex curvature, as above described, as long as angular rate about the sensitive axis is introduced into the instrument, the ball 101a will be displaced to one side of the center line and thus the race and contact will be under the force not only of the angular momentum of the balls but also of the force 102 acting on the balls in the direction indicated, thus firmly driving the contacts 32 into contact with the contacts 37. However, immediately upon removal of the angular rate about the sensitive axis, this force 102 will be overcome by the spring, and the balls will return to the center portion as shown in Figure 6.

Referring now to the column under the heading "self-erecting," as shown in Figures 6 and 8, it will be noted that in this case, the face 100b of the driver is concave. Here again, the degree of concavity has been exaggerated for clarity of illustration. With this type driver face, the ball 101b will be normally in the center position, as shown in full in Figure 6. The introduction of angular rate about the sensitive axis, however, will again displace the ball to one side or the other as shown in phantom in Figure 6. With this condition, there will be introduced a force 102a which upon removal of the angular rate about the sensitive axis will be effective to return the ball 101b to its central position and thus erect the race 16.

It will be appreciated that with the above described device, it is possible to sense or indicate any angular movement of the device with respect to the sensitive axis which is perpendicular to the plane defined by the axis of the rotating balls and the pivot axis.

Figure 4:
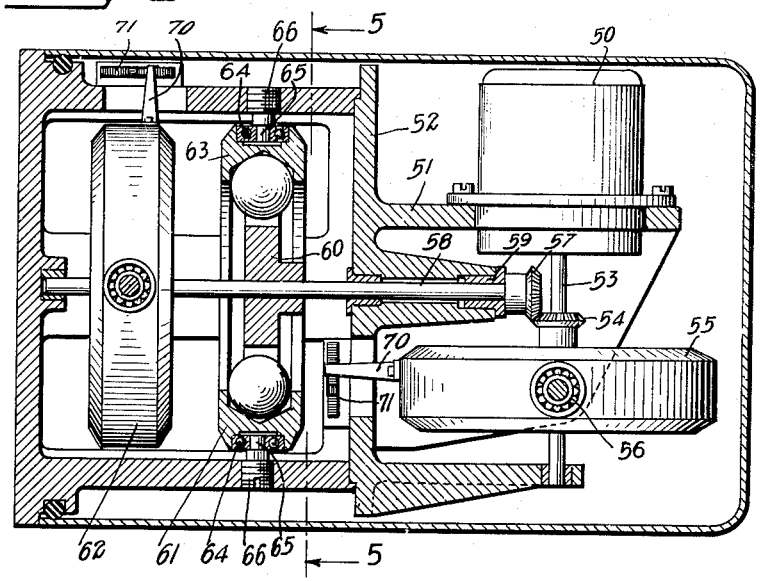
Figure 4 is a vertical section of the modification of the present invention, incorporating three angular rate instruments, each mounted so as to position the sensitive axes of the instruments mutually perpendicular to one another.
Figure 5:
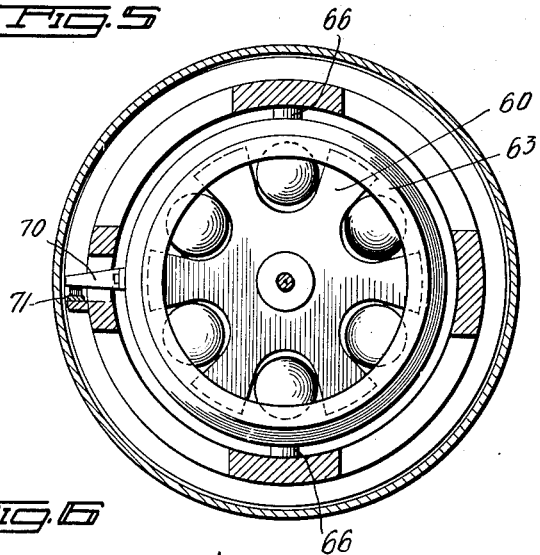
Figure 5 is a section taken along line 5—5 of Figure 4.

Referring now to Figures 4 and 5, there is shown an assembly including three angular rate instruments built in accordance with the above description but each disposed so that the sensitive axis of the instruments are mutually perpendicular to one another and each driven from a single electro-motor.

Referrring particularly to Figures 4 and 5, there is shown an electro-motor 50 mounted on a bracket 51 of a housing 52 and driving a shaft 53. The shaft 53 is provided with a beveled gear 54 and drives the driver (not shown) of an angular rate instrument 55. The angular rate instrument is pivotally mounted as by a ball bearing 56 and a diametrically opposed similar bearing (not shown) which receive pins mounted in a portion of the housing which has been broken away for clarity of illustration. The beveled gear 54 meshes with a similar beveled gear 57 carried by a shaft 58. The shaft 58 is mounted in a bearing 59 and drives the driver 60 of an angular rate instrument 61 and the driver (not shown) of an angular rate instrument 62. The angular rate instrument 61 is shown in cross section and such cross section and details of mounting are common to each of the angular rate instruments 55, 61 and 62. It will be noted that each of such angular rate instruments is provided with a race 63 having diametrically opposed ball bearings 64 receiving reduced portions 65 of pivot pins 66 mounted on a wall of the housing.

Each of the races similar to the race 63 mounts a contact arm 70 adapted to engage a potentiometer 71 and through suitable wiring (not shown) provide an electrical signal proportional to the rate of turn. This instrument may also be used with switching contacts as shown in Figures 1 through 3.

It will be appreciated that of the device just shown, any movement about any of the three mutually perpendicular axes will be sensed by one or the other of the angular rate instruments.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:

1. A mechanism of the type described comprising: a ring having an annular ball race therein pivotally mounted about a transverse axis thereof; a driver mounted within said ring; a plurality of balls mounted in said race and spaced substantially equidistantly therein; and means to actuate said driver to drive said balls around said race.

2. A mechanism of the type described comprising: a ring having an annular ball race therein pivotally mounted about a transverse axis thereof; a driver mounted within said ring; a plurality of balls mounted in said race and spaced substantially equidistantly therein; means to actuate said driver to drive said balls around said race; and an electric contact mounted on said race and adapted to close an electric circuit on movement of said race about said transverse axis.

3. A mechanism of the type described comprising: a ring having an annular ball race therein pivotally mounted about a transverse axis thereof; a driver mounted within said ring; a plurality of balls mounted in said race and spaced substantially equidistantly therein; means to actuate said driver to drive said balls around said race; and an electric contact mounted on said race and adapted to variably engage a potentiometer on varied movement of said race about said transverse axis.

4. A mechanism of the type described comprising: a ring having an annular ball race therein pivotally mounted about a transverse axis thereof; a driver mounted within said ring; a plurality of balls mounted in said race and spaced substantially equidistantly therein; means to actuate said driver to drive said balls around said race; and spring means engaging said race and yieldingly opposing movement of said race about said transverse axis.

5. A mechanism of the type described comprising: a ring having an annular ball race therein pivotally mounted about a transverse axis thereof; a driver mounted within said ring; a plurality of balls mounted in said race and spaced substantially equidistantly therein; and an electro-motor operatively connected to said driver to drive said balls around said race.

6. A mechanism of the type described comprising: a ring having an annular ball race therein pivotally mounted about a transverse axis thereof; a driver mounted within said ring; said driver comprising a disc having a plurality of circumferentially spaced semi-spherical openings therein; a like plurality of balls mounted in said race and openings; and means to actuate said driver to drive said balls around said race.

7. A device of the type described comprising: a housing; a ring having an annular ball race therein pivotally mounted in said housing about a transverse axis of said ring; a driver mounted within said ring; said driver comprising a disc having a plurality of circumferentially spaced semi-spherical openings therein; a like plurality of balls mounted in said race and said openings; and an electromotor operatively connected to said driver to drive said balls around said race.

8. A device of the type described comprising: a housing; a ring having an annular ball race therein pivotally mounted in said housing about a transverse axis of said ring; a driver mounted within said ring; said driver comprising a disc having a plurality of circumferentially spaced semi-spherical openings therein; a like plurality of balls mounted in said race and said openings; an electromotor operatively connected to said driver to drive said balls around said race; and an electric contact mounted on said race and adapted to close an electric circuit on movement of said race about said transverse axis.

9. A device of the type described comprising: a housing; a ring having an annular ball race therein pivotally mounted in said housing about a transverse axis of said ring; a driver mounted within said ring; said driver comprising a disc having a plurality of circumferentially spaced semi-spherical openings therein; a like plurality of balls mounted in said race and said openings; an electromotor operatively connected to said driver to drive said balls around said race; and an electric contact mounted on said race and adapted to variably engage a potentiometer on varied movement of said race about said transverse axis.

10. A device of the type described comprising: a housing; a ring having an annular ball race therein pivotally mounted in said housing about a transverse axis of said ring; a driver mounted within said ring; said driver comprising a disc having a plurality of circumferentially spaced semi-spherical openings therein; a like plurality of balls mounted in said race and said openings; an electro-motor operatively connected to said driver to drive said balls around said race; and spring means engaging said race and yieldingly opposing movement of said race about said transverse axis.

11. A device of the type described comprising: an angular rate instrument as set forth in claim 1; a second such instrument as set forth in claim 1 disposed with its sensitive axis perpendicular to the sensitive axis of said first instrument and a single electro-motor operatively connected to the drivers of both of said instruments to simultaneously drive said drivers.

12. A device of the type described comprising: an angular rate instrument as set forth in claim 1; a second such instrument as set forth in claim 1 disposed with its sensitive axis perpendicular to the sensitive axis of said first instrument; a third such instrument as set forth in claim 1 disposed with its sensitive axis perpendicular to the sensitive axes of both said first and said second instruments and a single electro-motor operatively connected to the drivers of each of said instruments to simultaneously drive said drivers.

13. A device as set forth in claim 11 including electrical contacts mounted on each said race and adapted to variably engage a potentiometer on varied movement of its associated race about its transverse axis.

14. A device as set forth in claim 12 including electrical contacts mounted on each said race and adapted to variably engage a potentiometer on varied movement of its associated race about its transverse axis.

15. A device as set forth in claim 4 in which said driver is provided with flat ball engaging driving faces engaging said balls at all times to apply force thereto in the same direction.

16. A device as set forth in claim 4 in which said driver is provided with convex ball engaging driving faces adapted to engage said balls to apply force at an angle to a line normal to the center of said convex face and diverging from said line when rate is introduced in said instrument about its sensitive axis.

17. A device as set forth in claim 1 in which said driver is provided with concave ball engaging driving faces adapted to engage said balls to apply force at an angle to a line normal to the center of said concave face and converging with said line when rate is introduced in said instrument about its sensitive axis.

References Cited in the file of this patent

UNITED STATES PATENTS

| 1,545,812 | Chessin | July 14, 1925 |
| 2,435,090 | McClellan | Jan. 27, 1948 |
| 2,439,358 | Divoll | Apr. 6, 1948 |
| 2,504,061 | Alkan | Apr. 11, 1950 |
| 2,607,231 | Schoeppel et al. | Aug. 19, 1952 |
| 2,641,134 | Kenyon | June 9, 1953 |

FOREIGN PATENTS

| 141,139 | Great Britain | Apr. 11, 1920 |
| 401,039 | Great Britain | Nov. 9, 1933 |